(12) United States Patent
Tadokoro et al.

(10) Patent No.: US 11,269,559 B2
(45) Date of Patent: Mar. 8, 2022

(54) DATA PROCESSING DEVICE

(71) Applicant: Kioxia Corporation, Tokyo (JP)

(72) Inventors: Hidekazu Tadokoro, Kawasaki (JP);
Takeshi Ishihara, Yokohama (JP);
Yohei Hasegawa, Fuchu (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/018,716

(22) Filed: Sep. 11, 2020

(65) Prior Publication Data

US 2021/0294528 A1    Sep. 23, 2021

(30) Foreign Application Priority Data

Mar. 18, 2020 (JP) .............................. JP2020- 047299

(51) Int. Cl.
*G06F 3/06*    (2006.01)
*G06F 9/50*    (2006.01)
*G06F 16/17*   (2019.01)

(52) U.S. Cl.
CPC ............ *G06F 3/0659* (2013.01); *G06F 3/061* (2013.01); *G06F 3/0679* (2013.01); *G06F 9/5038* (2013.01); *G06F 16/17* (2019.01)

(58) Field of Classification Search
CPC ....... G06F 3/0659; G06F 3/061; G06F 3/0679
USPC ....................................................... 711/154
See application file for complete search history.

(56) References Cited

U.S. PATENT DOCUMENTS

| 10,445,260 B2 | 10/2019 | Walker et al. |
| 2017/0185327 A1* | 6/2017 | Powell ................. G06F 3/0604 |
| 2019/0303024 A1 | 10/2019 | Iwai et al. |
| 2019/0306281 A1* | 10/2019 | Masputra .............. G06F 12/084 |
| 2019/0306282 A1* | 10/2019 | Masputra ............ H04L 49/9052 |
| 2019/0317906 A1 | 10/2019 | Adavi et al. |
| 2019/0361630 A1 | 11/2019 | Frolikov |
| 2020/0225883 A1* | 7/2020 | Bhimani .............. G06K 9/6218 |

FOREIGN PATENT DOCUMENTS

JP    2019-175292 A    10/2019

\* cited by examiner

*Primary Examiner* — Than Nguyen
(74) *Attorney, Agent, or Firm* — Oblon, McClelland, Maier & Neustadt, L.L.P.

(57) ABSTRACT

According to one embodiment, a data processing device including a user space including a user space thread including a plurality of coroutines and a file system. The file system is configured to: allocate a plurality of processes generated by an application to the plurality of coroutines; check the plurality of coroutines in order; when a first process included in the plurality of processes is allocated to a first coroutine included in the plurality of coroutines, write a first IO request based on the first process in a submission queue; and when the submission queue is filled, or when checking the plurality of coroutines is finished, transmit the first IO request written in the submission queue to a storage device.

16 Claims, 8 Drawing Sheets

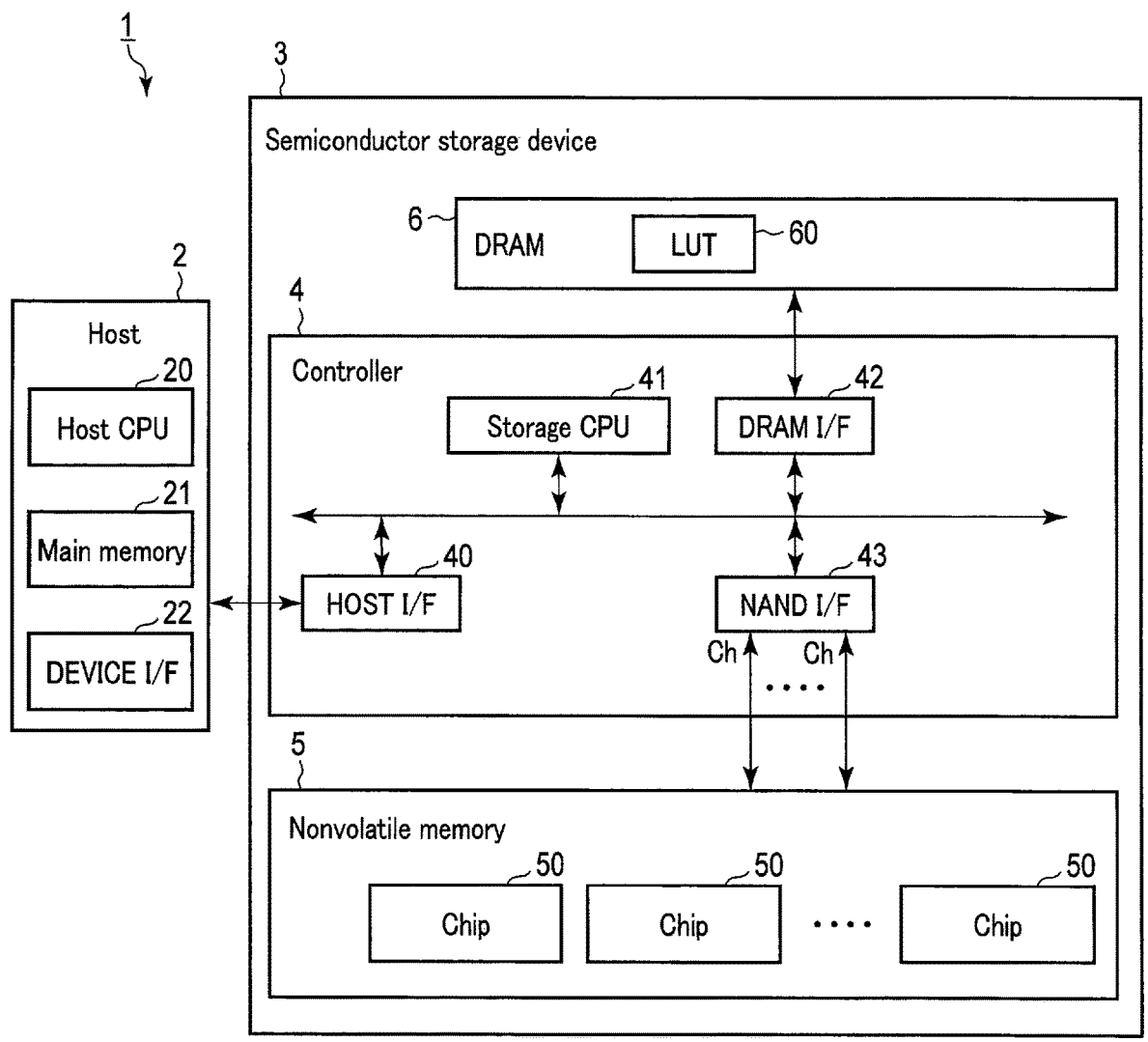
F I G. 1

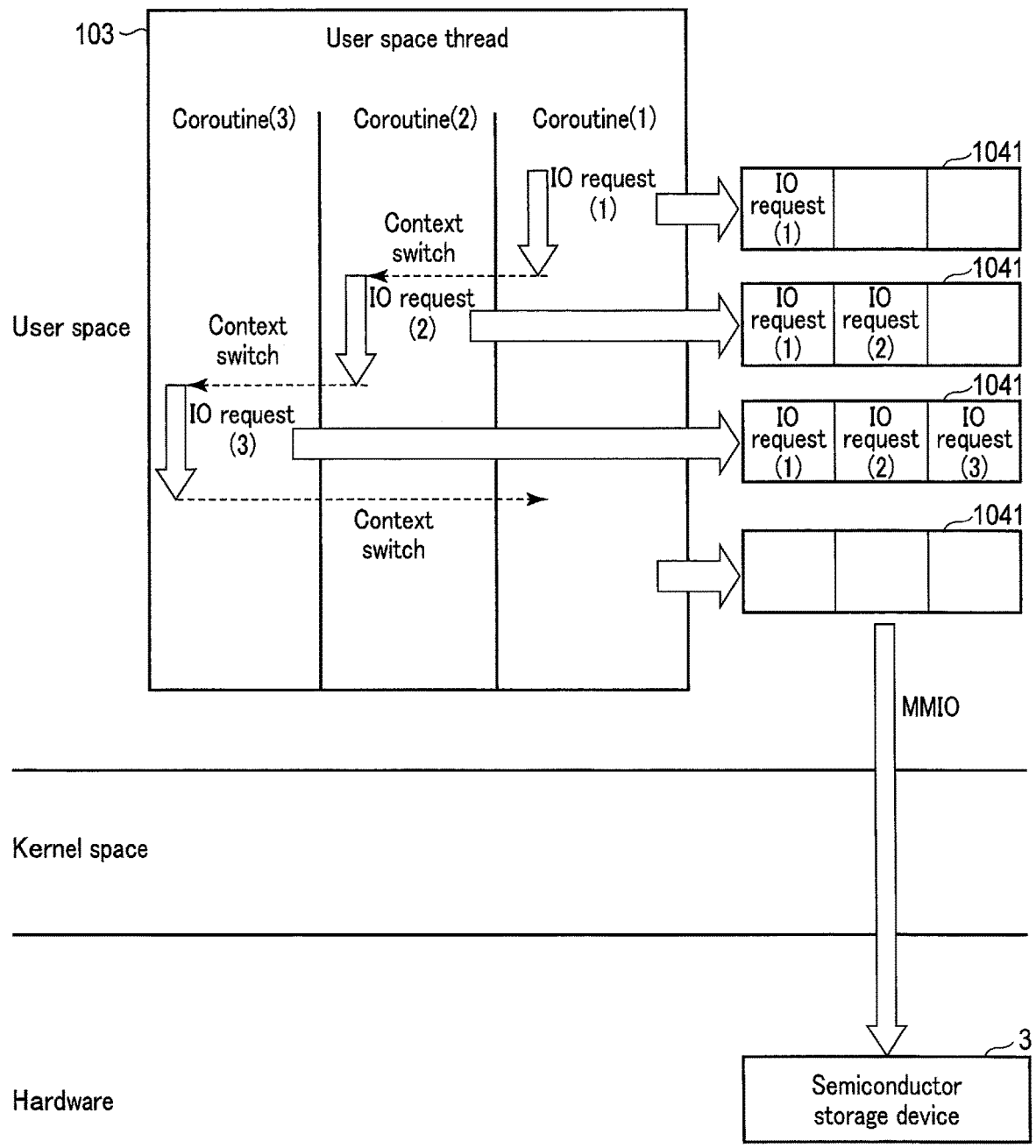
F I G. 4

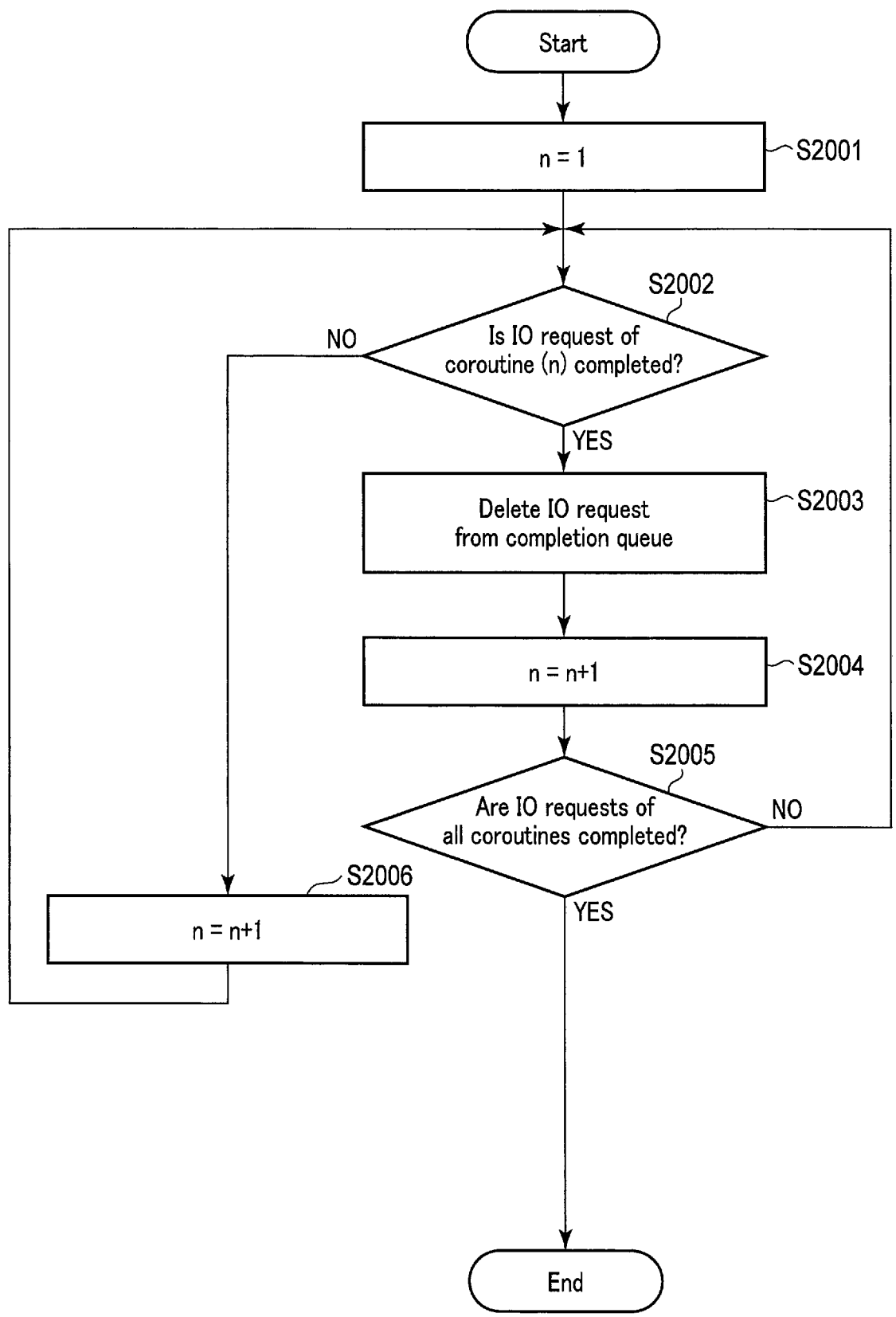
F I G. 5

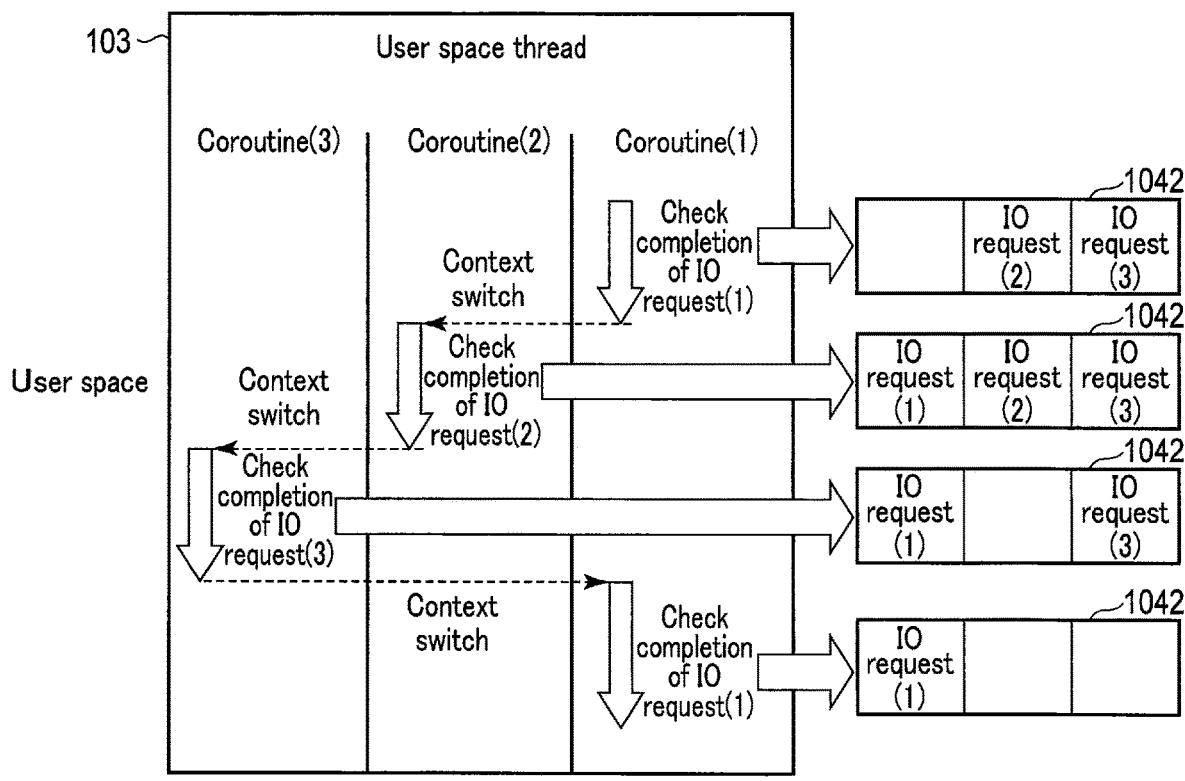
F I G. 6
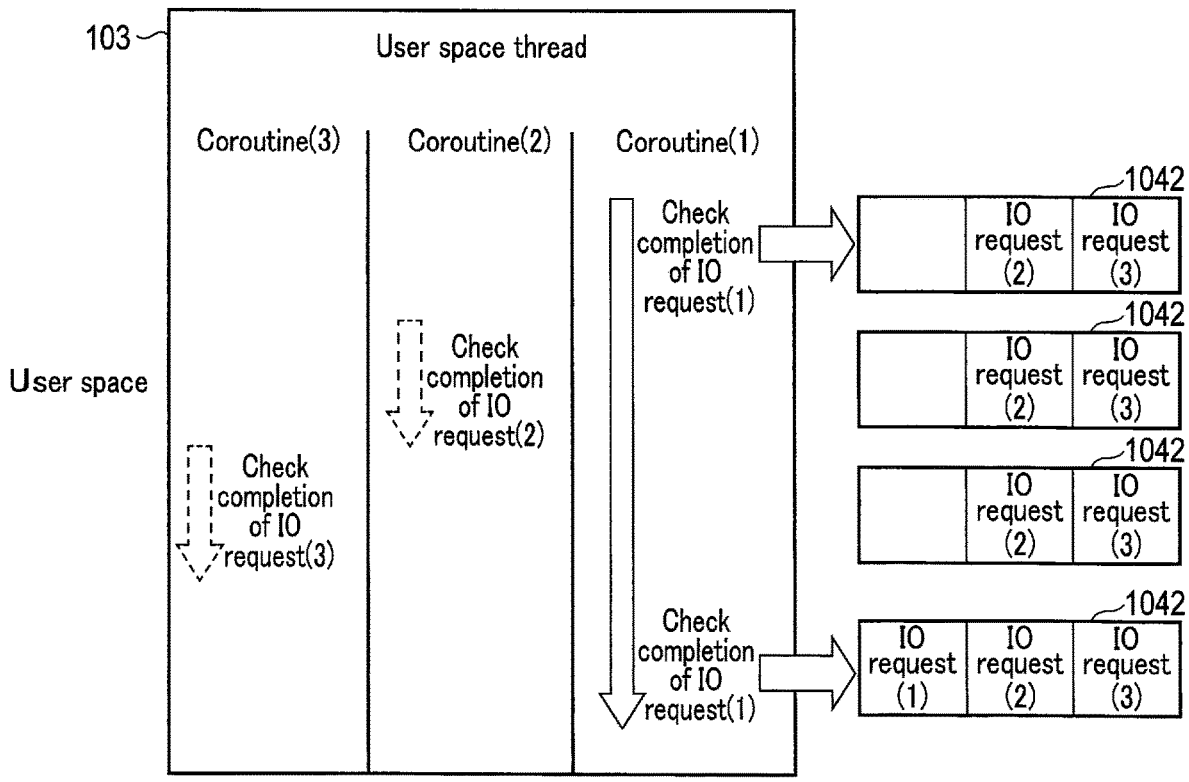
F I G. 7

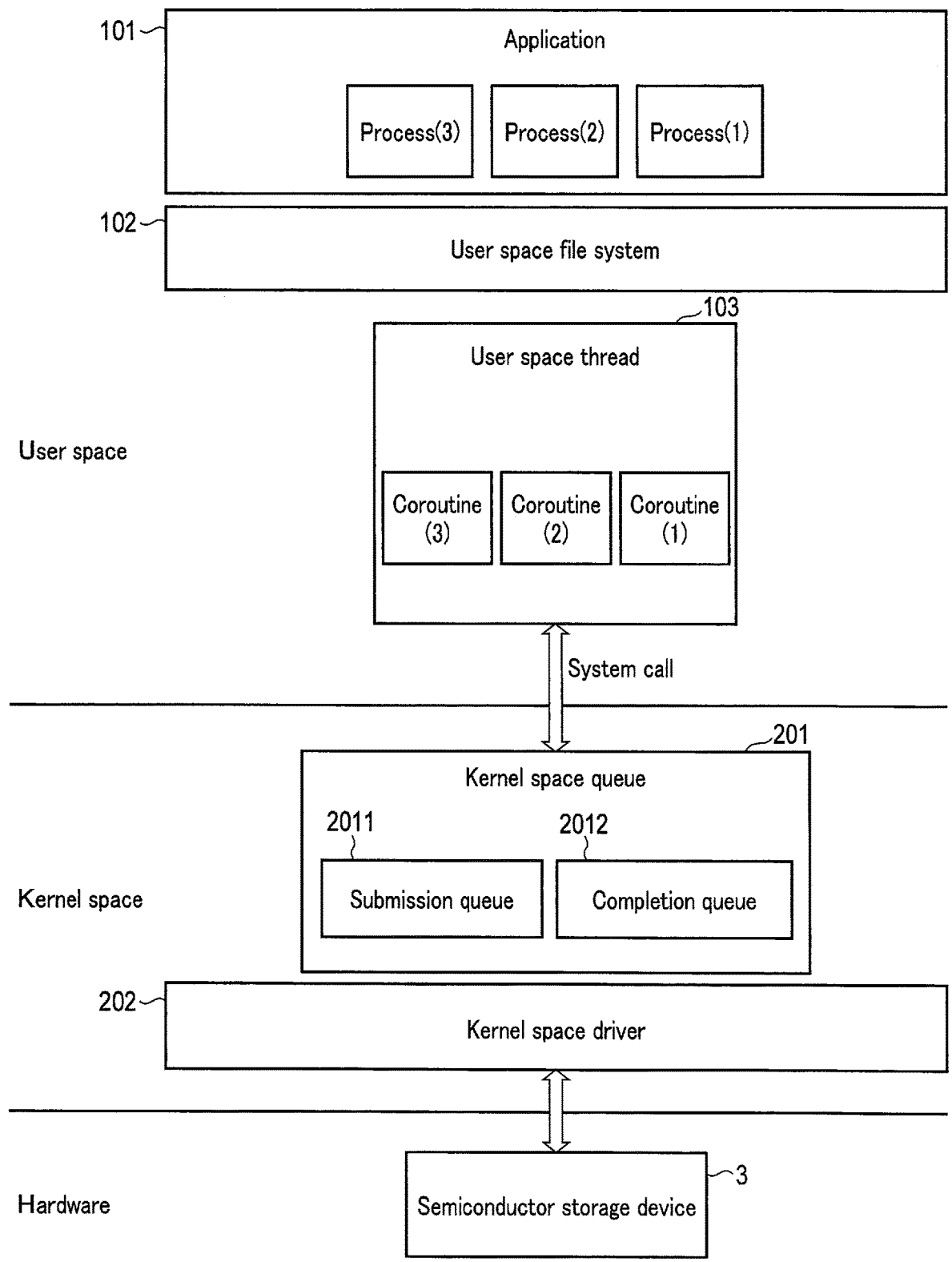
F I G. 9

DATA PROCESSING DEVICE

CROSS-REFERENCE TO RELATED APPLICATIONS

This application is based upon and claims the benefit of priority from Japanese Patent Application No. 2020-047299, filed Mar. 18, 2020, the entire contents of which are incorporated herein by reference.

FIELD

Embodiments described herein relate generally to a data processing device.

BACKGROUND

In recent years, a storage including a nonvolatile memory has become widespread.

BRIEF DESCRIPTION OF THE DRAWINGS

FIG. 1 illustrates a hardware configuration of a computer system according to a first embodiment;
FIG. 4 illustrates an example of issuance of an IO request of the computer system according to the first embodiment;
FIG. 5 is a flowchart indicating detection of IO request completion of the computer system according to the first embodiment;
FIG. 6 illustrates an example of detection of IO request completion of the computer system according to the first embodiment;
FIG. 7 illustrates an example of detection of IO request completion of a computer system according to a comparative example;
FIG. 9 illustrates a software configuration of a computer system according to a third embodiment.

DETAILED DESCRIPTION

Figure 2:
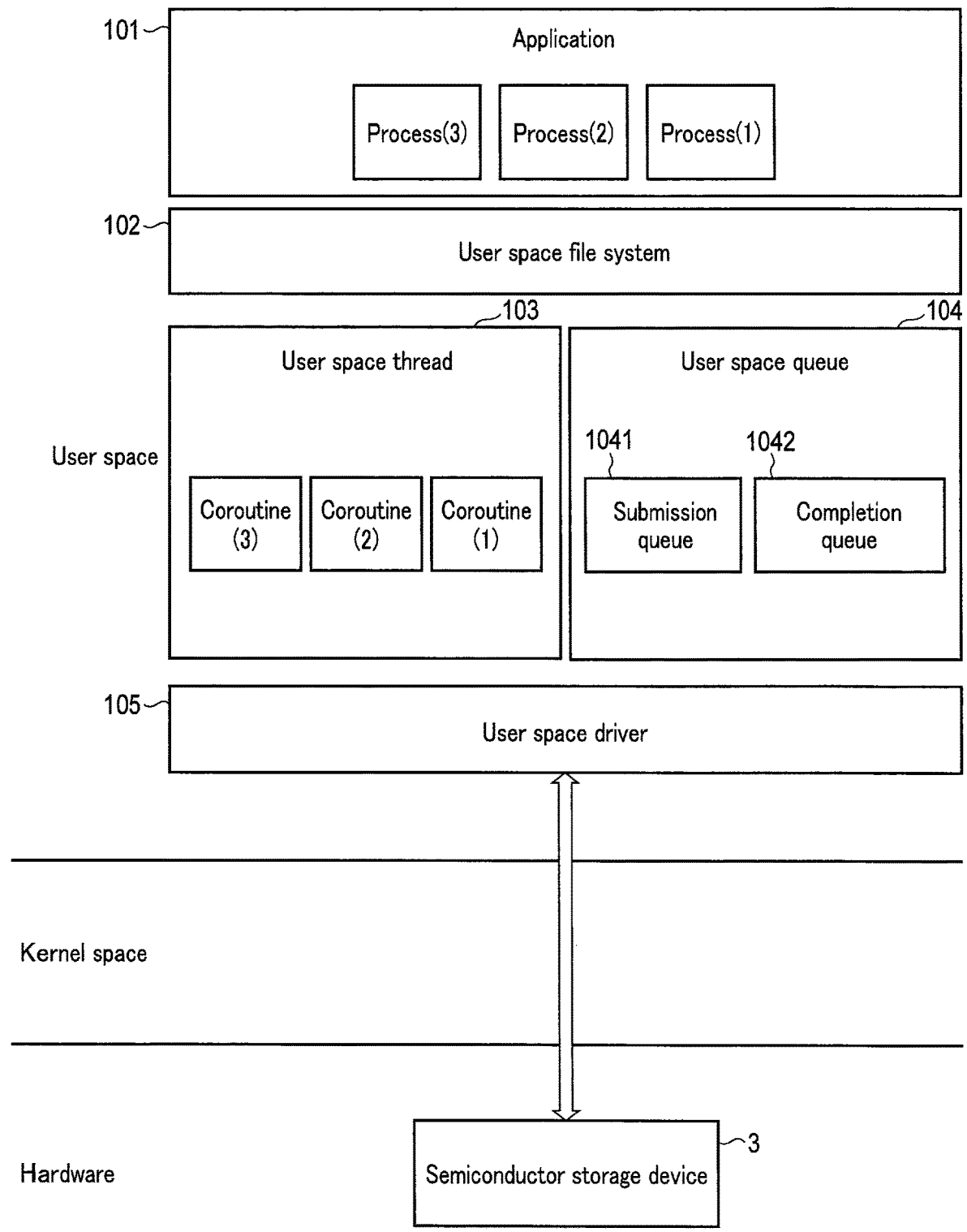
FIG. 2 illustrates a software configuration of the computer system according to the first embodiment.

In general, according to one embodiment, a data processing device including a user space including a user space thread including a plurality of coroutines and a file system. The file system is configured to: allocate a plurality of processes generated by an application to the plurality of coroutines; check the plurality of coroutines in order; when a first process included in the plurality of processes is allocated to a first coroutine included in the plurality of coroutines, write a first IO request based on the first process in a submission queue; and when the submission queue is filled, or when checking the plurality of coroutines is finished, transmit the first IO request written in the submission queue to a storage device.

Hereinafter, embodiments will be described with reference to the accompanying drawings. In the following description, structural elements having substantially the same function and configuration will be assigned the same reference numeral or symbol. Each of the embodiments described below merely indicates an exemplary apparatus or method for embodying the technical idea of the embodiment. The materials, shapes, structures, arrangements, etc. of the structural elements of the technical ideas of the embodiments are not limited to the ones described below. A technical idea of the embodiment may be modified in various manners in the claims.

Each functional block can be implemented as hardware, computer software, or a combination of both. For this reason, in order to clearly illustrate that each block can be any of them, descriptions will be given in terms of their functionalities in general. Whether the functions are implemented as hardware or software depends on specific embodiments or design restrictions imposed on the entire system. While those skilled in the art can realize these functions in various ways in each specific embodiment, determining such an embodiment is included within the scope of the invention.

<1> First Embodiment
<1-1> Hardware Configuration
<1-1-1> Overview of Computer System First, with reference to FIG. 1, a hardware configuration of a computer system 1 according to a first embodiment will be described. FIG. 1 illustrates the hardware configuration of the computer system 1 according to the first embodiment.

The computer system 1 includes a host (host device) 2 and a semiconductor storage device 3.

The host 2 is an information processing device (computing device) that accesses the semiconductor storage device 3. The host 2 may be a personal computer, or a server (storage server) that stores a large amount of various data items in a semiconductor storage device.

The semiconductor storage device 3 is, for example, realized as a solid state drive (SSD) including a NAND-type flash memory. The semiconductor storage device 3 may be used as a main storage of the host 2. The semiconductor storage device 3 may be built in the host 2, or may be coupled to the host 2 through a cable or a network.

Examples of an interface for mutually coupling the host 2 and the semiconductor storage device 3 include a Small Computer System Interface (SCSI), a Serial Attached SCSI (SAS), an Advanced Technology Attachment (ATA), a Serial ATA (SATA), a Peripheral Component Interconnect Express (PCIe) (Trademark), Ethernet (Trademark), a Fibre channel, a Non Volatile Memory Express (NVMe) (Trademark), Universal Flash Storage (UFS), and an embedded Multi Media Card (eMMC) (Trademark). In the first embodiment, a description will be given of a case in which NVMe is used as an interface for mutually coupling the host 2 and the semiconductor storage device 3.

<1-1-2> Semiconductor Storage Device
<1-1-2-1> Overview of Semiconductor Storage Device The semiconductor storage device 3 includes a controller 4, a nonvolatile memory 5, and a volatile memory (e.g., dynamic random access memory (DRAM)) 6. The controller 4 may be realized by a circuit such as a system-on-a-chip (SoC).

The controller 4 receives an IO request (request of IO processing) from the host 2, and controls the nonvolatile memory 5 based on the received IO request. Specifically, the memory controller 4 writes data, which the host 2 instructed the controller 4 to write, in the nonvolatile memory 5, and reads data, which the host 2 instructed the controller 4 to read, from the nonvolatile memory 5, and transmits the data to the host 2. The controller 4 is coupled to the nonvolatile memory 5 via NAND buses. The nonvolatile memory 5 includes a plurality of memory cells to store data in a non-volatile manner.

<1-1-2-2> DRAM

A random access memory such as the DRAM 6 is provided with, for example, a cache area of a lookup table (LUT) 60 functioning as an address translation table (logical-to-physical address translation table) The lookup table 60 manages mapping between logical addresses and physical addresses of the nonvolatile memory 5. Furthermore, the DRAM 6 may be provided with a storage area for various information items used during processing. The DRAM 6 may be provided inside the controller 4.

<1-1-2-3> Nonvolatile Memory

The nonvolatile memory 5 may include a plurality of NAND flash memory chips (also referred to as chips) 50. Each chip is realized as a flash memory configured to store a plurality of bits per memory cell. In the NAND flash memory, in general, writing and reading are performed in a data unit called a page, and erasing is performed in a data unit called a block.

<1-1-2-4> Controller

The controller 4 includes a host interface (HOST I/F) 40, a storage central processing unit (CPU) 41, a DRAM interface (DRAM I/F) 42, and a NAND interface (NAND I/F) 43.

The host interface 40, the storage CPU 41, the DRAM interface 42, and the NAND interface 43 may be mutually coupled via buses.

The host interface 40 functions as a circuit that receives various commands from the host 2, e.g., I/O commands, various control commands, etc. The I/O command may include a write command, a read command, etc.

The storage CPU 41 is a processor configured to control the host interface 40, the DRAM interface 42, and the NAND interface 43. The storage CPU 41 performs various types of processing by executing control programs (firmware) stored in a ROM or the like (not shown). The storage CPU 41 can execute command processing, etc. for processing various commands from the host 2.

The operation of the storage CPU 41 is controlled by the above-described firmware executed by the storage CPU 41. The controller 4 may include, instead of the storage CPU 41, a field-programmable gate array (FPGA) or an application specific integrated circuit (ASIC). That is, the controller 4 may be composed of software, hardware, or a combination thereof.

The DRAM interface 42 functions as a DRAM controller configured to control the access of the DRAM 6.

The NAND interface 43 electrically couples the nonvolatile memory 5 and the controller 4. The NAND interface 43 functions as a NAND control circuit configured to control the nonvolatile memory 5. For the NAND interface 43, standards such as Toggle Double Data Rate (DDR), Open NAND Flash Interface (ONFI), etc. may be adopted. The NAND interface 43 may be coupled to each of the plurality of chips in the nonvolatile memory 5 via a plurality of channels.

The controller 4 functions as a memory controller configured to control the nonvolatile memory 5. The controller 4 may function as a flash translation layer (FTL) configured to execute data managing and block managing of the nonvolatile memory 5. The logical address is an address used by the host 2 to address the semiconductor storage device 3. For the logical address, for example, a logical block address (LBA) is used.

The management between logical block addresses (LBA) and physical addresses is executed using the lookup table 60 that functions as the address translation table (logical-to-physical address translation table). The controller 4 uses the lookup table 60 to manage mapping between logical block addresses and physical addresses in a predetermined management unit. A physical address corresponding to a certain logical block address indicates a physical memory location in the nonvolatile memory 5 in which data of the logical block address is written. The lookup table 60 may be loaded onto the DRAM 6 from the nonvolatile memory 5 when the semiconductor storage device 3 is powered on.

<1-1-3> Host

Next, the configuration of the host 2 will be described. The host 2 includes a host CPU 20, a main memory (e.g., DRAM) 21, and a device interface (Device I/F) 22. The host CPU 20, the main memory 21, and the device interface 22 are coupled via buses.

The host 2 is coupled to the semiconductor storage device 3 via the device interface 22. In the nonvolatile memory 5 of the semiconductor storage device 3, an operating system (OS), an application program, etc. are stored. When the host 2 is activated, the OS (also referred to as basic software), application program, etc. are read out from the nonvolatile memory 5 to the host 2. Then, the host 2 stores the OS, application program, etc. in the main memory 21. The host CPU 20 executes the OS, application program, etc. stored in the main memory 21.

The main memory 21 is, for example, DRAM. However, the main memory 21 may be a nonvolatile memory such as magneto-resistive random access memory (MRAM), ferro-electric random access memory (FeRAM), phase change random access memory (PRAM), resistive random access memory (ReRAM) or the like.

Although illustration is omitted in FIG. 1 for the sake of simplicity, a display (e.g., liquid crystal display (LCD)) and external input means (keyboard, mouse, etc.) may be coupled to the host 2.

<1-2> Software

<1-2-1> Outline

Next, with reference to FIG. 2, a software configuration of the computer system 1 according to the first embodiment will be described. FIG. 2 illustrates a software configuration of the computer system 1 according to the first embodiment.

As illustrated in FIG. 2, the software configuration of the computer system 1 roughly includes a kernel space and a user space.

When a program is executed in the computer system 1, the kernel space and the user space are used to process the program.

<1-2-2> Kernel Space

When the host 2 is activated, first, the OS installed in the semiconductor storage device 3 is developed in the main memory 21. Software that constitutes the core of the OS is referred to as a kernel. The memory area of the main memory 21 used by the kernel is referred to as a "kernel space".

The kernel manages an execution state of the program in operation, and manages hardware (host CPU 20, main memory 21, semiconductor storage device 3, etc.) to provide means for using functions of hardware by the application (software operating on the OS).

The kernel is the core of the OS, and if the kernel space is damaged, the OS may stop. A user using the application will thus be unable to access the kernel space.

<1-2-3> User Space

When the program is activated on the OS, under the management of the OS, the application (software operating on the OS), etc. is developed in the main memory 21. A memory area of the main memory 21 used by the application (software operating on the OS) is referred to as a "user space".

When the user gives an instruction to the application, the application generates a process for executing the instruction. The unit of processing executed by the host CPU 20 is referred to as a "process". The "process" is also referred to as a "task".

The application may access the kernel space as necessary.

A method in which the application accesses the kernel space to execute the process is described as a system call.

The first embodiment describes a method in which the application accesses the semiconductor storage device 3 without using the kernel space.

In the user space, each process in an application 101 is executed by using a user space file system 102, a user space thread 103, a user space queue 104, and a user space driver 105.

The application 101 is a program that the user can execute. The application 101 executes a plurality of processes (processes (1) to (3) in the example of FIG. 2) in response to the user's instructions.

The user space driver 105 is a driver for connection to the semiconductor storage device 3. For example, if the semiconductor storage device 3 adopts NVMe, the user space driver 105 is a driver adaptable to NVMe. A driver for connection to the semiconductor storage device 3 performs operation in the user space in the computer system 1 according to the first and second embodiments, and performs operation in the kernel space in the computer system 1 according to the third embodiment.

In the first embodiment, the host 2 and the semiconductor storage device 3 are connected by a memory mapped input/output (MMIO) method.

MMIO is a method in which the host CPU 20 handles the instruction to access the semiconductor storage device 3 in the same address space as the instruction to access the main memory 21. The address space is a range of the main memory 21 accessible by addressing.

The user space file system 102 divides areas provided in the semiconductor storage device 3 (storage media such as NAND-type flash memory chips 50, partitions dividing the insides thereof, volumes, etc.) into areas of equal capacity, and produces a management area to record what is recorded and where it is recorded. The user space file system 102 is, for example, ext4 (Fourth Extended File System). In file systems such as ext4, in the computer system 1 of the first embodiment, a file system is prepared not only in the kernel space but also in the user space. The user space file system 102 bypasses the kernel space. The user space file system 102 uses no interrupt during polling. The user space file system 102 can cause, for example, any POSIX-compliant OSs to operate in the same manner. That is, in the computer system 1 according to the first embodiment, it is possible to use an existing ext4 file system as it is in the user space. Specifically, it is realized by hooking open and calling an implemented file system code. In the computer system 1 of the first embodiment, existing tools such as mkfs and fsck can be used in the user space.

The user space file system 102 cooperates with the user space driver 105. The user space file system 102 performs, for example, setting of Direct Memory Access (DMA) and MMIO in the user space. That is, the IO request to the semiconductor storage device 3 is realized only in the user space without passing through the kernel space.

The user space file system 102 includes a POSIX-compatible interface, a file system operation subsystem, a user space NVMe driver, etc.

The user space thread 103 is a flow of processing in which the OS programs are executed in succession. Specifically, the user space thread 103 includes a plurality of coroutines (coroutines (1) to (3) in the example of FIG. 2). A coroutine (also described as a small execution row) is a type of programing structure. The coroutine allows processing execution to be suspended and resumed during execution. The host 2 can execute only one coroutine simultaneously. By using a function called context switch, the host 2 can switch from one coroutine to another coroutine. The coroutine is a light thread in which a context switch is possible in a few ns. During a context switch, the user space thread 103 saves, in a stack, a memory device (register) inside the host CPU 20, and switches a stack pointer. A stack is a memory area in which data stored first can be extracted last while data stored last can be extracted first. A stack pointer is a type of a register that stores data inside the host CPU 20, and is for storing an address at a position most recently referred to of the memory area called a stack. The user space thread 103 can realize scheduling without using a kernel. The user space thread 103 can cause, for example, any POSIX-compliant OS to operate in the same manner. Specifically, a coroutine library having the same interface as a POSIX-compliant OS is produced, and the coroutine library is called instead of using a POSIX-compliant OS. For example, it is realized by hooking pthread_create and calling a code for producing a coroutine.

For example, the user space thread 103 includes a Pthread-compatible Layer, Coroutine Scheduler, and libcoro.

The user space file system 102 cooperates with the coroutine, issuing or completing the IO request in an efficient manner.

The user space queue 104 includes a submission queue 1041 and a completion queue 1042. The submission queue 1041 is a command queue having a specific slot size, and is used by the host 2 to issue an IO request executed by the controller 4 of the semiconductor storage device 3. The completion queue 1042 is a response queue having a specific slot size, and is used to provide notification of a status for a completed IO request.

When accessing the semiconductor storage device 3 via the application 101, the user can access the semiconductor storage device 3 through the user space file system 102, the user space thread 103, the user space queue 104, and the user space driver 105, without using the kernel space. The user space file system 102, the user space thread 103, the user space queue 104, and the user space driver 105 may be collectively referred to as a library.

<1-3> Operation

<1-3-1> Outline

In recent years, ultra-low latency SSD (ULL SSD) has been developed. One of the features of ULL SSD is that it is capable of increasing the speed of an existing application.

Currently, there are many POSIX-compliant applications (e.g., SQLite, RocksDB, etc.).

However, accessing ULL SSD via the kernel space may not easily bring out the performance of ULL SSD.

An example of software sufficiently bringing out the performance of ULL SSD includes a store performance development kit (SPDK), and the like. However, if SPDK is adopted, in consideration of compatibility with existing applications compatible with POSIX, there is a need to change to applications compatible with SPDK.

Thus, the first embodiment provides software that sufficiently brings out the performance of ULL SSD while maintaining compatibility with existing applications compatible with POSIX.

Hereinafter, a software operation of the computer system 1 according to the first embodiment will be described.

<1-3-2> Issuance of IO Request

Figure 3:
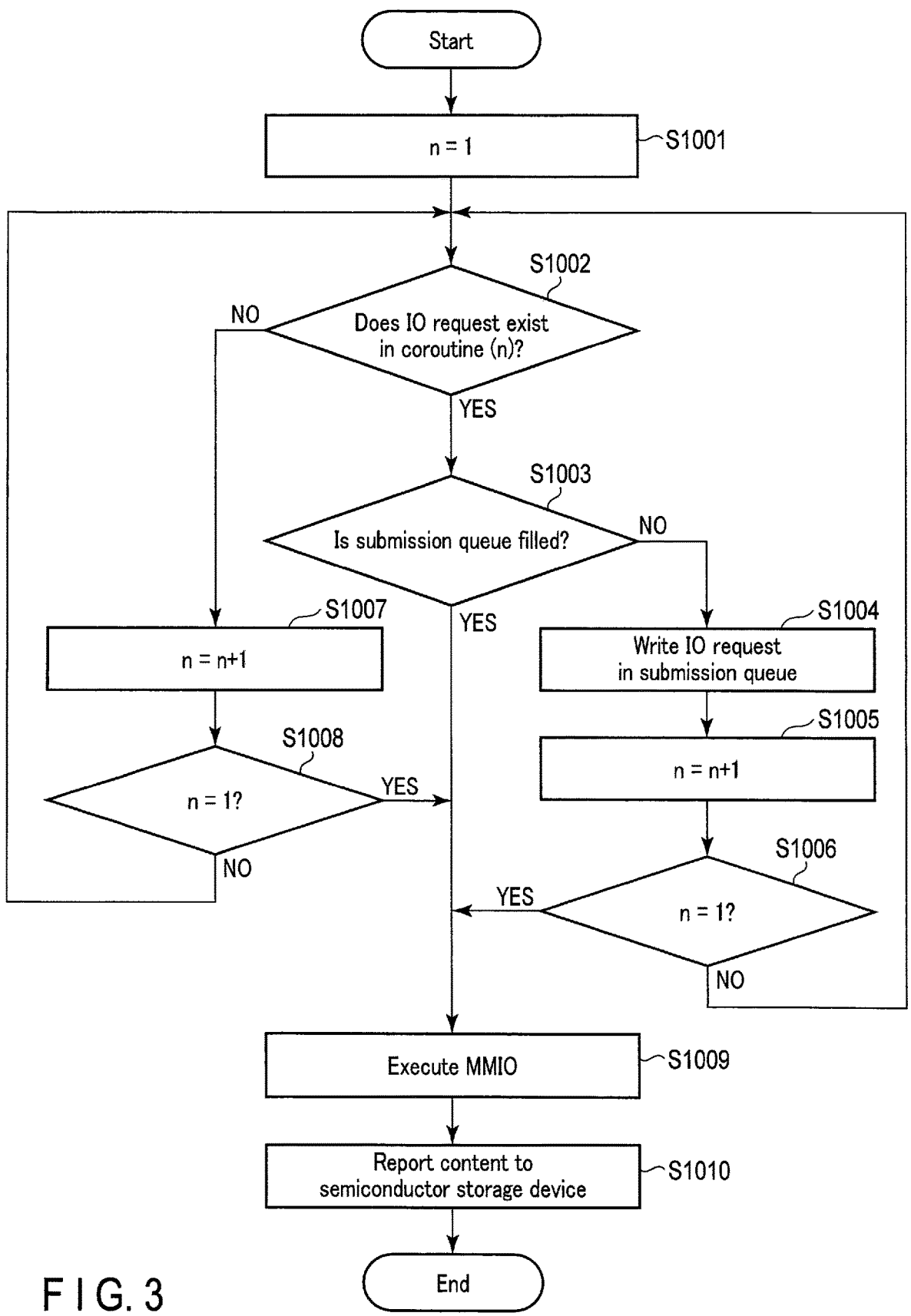
FIG. 3 is a flowchart indicating issuance of an IO request of the computer system according to the first embodiment.

With reference to FIG. 3, a description will be given of issuance of an IO request of the computer system 1 according to the first embodiment. FIG. 3 is a flowchart indicating issuance of an IO request of the computer system 1 according to the first embodiment.

The application 101 generates a process based on an instruction from the user. The user space file system 102 allocates the process generated by the application 101 to the coroutine of the user space thread 103 as an IO request.

The user space file system 102 operates in line with the flowchart of FIG. 3 when issuing an IO request to the semiconductor storage device 3.

[S1001]

The user space file system 102 selects coroutine (n) (n=1) when issuing an IO request to the semiconductor storage device 3.

[S1002]

The user space file system 102 determines whether an IO request (process generated by the application 101) exists in coroutine (n).

[S1003]

When it is determined that an IO request exists in coroutine (n) (S1002, YES), the user space file system 102 determines whether the submission queue 1041 is filled.

[S1004]

When it is determined that the submission queue 1041 is not filled (S1003, NO), the user space file system 102 writes the IO request of coroutine (n) in the submission queue 1041 as a coroutine execution.

[S1005]

The user space file system 102 performs a context switch, and switches an execution right to a next coroutine (n) (n=n+1). For example, if coroutine (n) is the last coroutine, coroutine (n) is returned to coroutine (1).

[S1006]

The user space file system 102 determines whether coroutine (n) has been returned to coroutine (1). When it is determined that coroutine (n) has not been returned to coroutine (1) (S1006, NO), the user space file system 102 repeats step S1002.

[S1007]

When it is determined that no IO request exists in coroutine (n) (S1002, NO), the user space file system 102 performs a context switch, and switches the execution right to the next coroutine (n) (n=n+1).

[S1008]

The user space file system 102 determines whether coroutine (n) has been returned to coroutine (1). When it is determined that coroutine (n) has not been returned to coroutine (1) (S1008, NO), the user space file system 102 repeats step S1002.

[S1009]

When it is determined that the submission queue 1041 is filled (S1003, YES) or it is determined that coroutine (n) has been returned to coroutine (1) (S1006, YES, or S1008, YES), the user space file system 102 executes MMIO.

[S1010]

The user space driver 105 transmits, based on MMIO, content of the 10 request written in the submission queue 1041 to the semiconductor storage device 3. That is, the host 2 can transmit the IO request to the semiconductor storage device 3 without using the kernel space.

<1-3-3> Example of Issuance of IO Request

With reference to FIG. 4, a description will be given of an example of issuance of an IO request of the computer system 1 according to the first embodiment. FIG. 4 illustrates an example of issuance of an IO request of the computer system 1 according to the first embodiment. For the sake of simplicity, FIG. 4 illustrates the user space thread 103, the submission queue 1041, and the semiconductor storage device 3. Furthermore, FIG. 4 illustrates a case where an IO request is issued under a condition in which there is a vacancy in the submission queue 1041.

For example, upon receipt of the user's instructions, the application 101 generates processes (1) to (3). The user space file system 102 allocates process (1) to coroutine (1) as IO request (1), allocates process (2) to coroutine (2) as IO request (2), and allocates process (3) to coroutine (3) as IO request (3). In this manner, the user space file system 102 groups a plurality of processes as a single instruction row in the user space thread 103. For example, execution of MMIO requires a long time. Thus, if MMIO is executed for every process, the operation time would be longer. Thus, in the first embodiment, a plurality of processes are grouped together to reduce the number of times of executing MMIO.

In issuing the IO request, the user space file system 102 checks whether an IO request (1) allocated to coroutine (1) exists. When it is determined that an IO request (1) exits in coroutine (1) and the submission queue 1041 is not filled, the user space file system 102 writes an IO request (1) in the submission queue 1041 as a coroutine execution.

When execution of coroutine (1) is completed, the user space file system 102 performs a context switch, and switches the execution right to coroutine (2).

The user space file system 102 checks whether an IO request (2) allocated to coroutine (2) exists. When it is determined that an IO request (2) exists in coroutine (2) and the submission queue 1041 is not filled, the user space file system 102 writes IO request (2) in the submission queue 1041 as a coroutine execution.

When execution of coroutine (2) is completed, the user space file system 102 performs a context switch, and switches the execution right to coroutine (3).

The user space file system 102 checks whether an IO request (3) allocated to coroutine (3) exists. When it is determined that an ID request (3) exists in the coroutine (3) and the submission queue 1041 is not filled, the user space file system 102 writes IO request (3) in the submission queue 1041 as a coroutine execution.

When execution of coroutine (3) is completed, the user space file system 102 performs a context switch, and switches the execution right to coroutine (1).

The coroutine returning to coroutine (1) is regarded as all of coroutine processing having been completed.

Accordingly, the user space file system 102 executes MMIO on IO requests (1) to (3) written in the submission queue 1041.

Then, IO requests (1) to (3) are transmitted to the semiconductor storage device 3 via the user space driver 105.

<1-3-4> Detection of IO Request Completion

With reference to FIG. 5, a description will be given of detection of IO request completion of the computer system 1 according to the first embodiment. FIG. 5 is a flowchart indicating detection of IO request completion of the computer system 1 according to the first embodiment.

For the sake of simplicity, only detection of IO request completion will be described. However, the user space file system 102 detects IO request completion regularly, for example, in the IO request processing (hereinafter, simply referred to as polling).

[S2001]

When performing polling, the user space file system 102 selects coroutine (n) (n=1).

[S2002]

The user space file system 102 determines whether the IO request for coroutine (n) has been completed. Specifically, when the IO request is completed, the completed IO request is written in the completion queue 1042. The user space file system 102 determines whether the IO request for coroutine (n) is written in the completion queue 1042.

[S2003]

When it is determined that the IO request for coroutine (n) is completed (S2002, YES), the user space file system 102 considers that the IO request made by coroutine (n) has been completed and deletes the IO request of coroutine (n) from the completion queue 1042.

The user space file system 102 performs a context switch, and switches the execution right to the next coroutine (n) (n=n+1). For example, if coroutine (n) is the last coroutine, coroutine (n) is returned to coroutine (1).

[S2005]

The user space file system 102 determines whether IO requests of all coroutines have been completed. When it is determined that not all coroutines have been completed (S2005, NO), the user space file system 102 repeats step S2002. When it is determined that all coroutines have been completed (S2005, YES), the user space file system 102 ends the operation.

[S2006]

When it is determined that the IO request for coroutine (n) has not been completed (S2002, NO), the user space file system 102 performs a context switch, and switches the execution right to the next coroutine (n) (n=n+1). For example, if coroutine (n) is the last coroutine, coroutine (n) is returned to coroutine (1). Thereafter, step S2002 is repeated.

<1-3-5> Example of Detection of IO Request Completion

With reference to FIG. 6, a description will be given of an example of detection of IO request completion of the computer system 1 according to the first embodiment. FIG. 6 illustrates an example of detection of IO request completion of the computer system 1 according to the first embodiment. For the sake of simplicity, FIG. 6 illustrates the user space thread 103 and the completion queue 1042.

Here, an IO request for coroutine (1) is described as IO request (1), an IO request for coroutine (2) is described as IO request (2), and an IO request for coroutine (3) is described as IO request (3).

When polling, the user space file system 102 refers to the completion queue 1042 to check if an IO request (1) allocated to coroutine (1) exists.

Regardless of whether an IO request (1) exists in the completion queue 1042, the user space file system 102 completes polling of coroutine (1). In the example of FIG. 6, no IO request (1) exists in the completion queue 1042; thus, it is determined that IO request (1) has not been completed.

When polling of coroutine (1) is completed, the user space file system 102 performs a context switch, and switches the execution right to coroutine (2).

The user space file system 102 refers to the completion queue 1042 to check if an IO request (2) allocated to coroutine (2) exists.

Regardless of whether an IO request (2) exists in the completion queue 1042, the user space file system 102 completes polling of coroutine (2). In the example of FIG. 6, an IO request (2) exists in the completion queue 1042; thus, it is determined that IO request (2) has been completed. Then, the user space file system 102 deletes IO request (2) from the completion queue 1042.

When polling of coroutine (2) is completed, the user space file system 102 performs a context switch, and switches the execution right to coroutine (3).

The user space file system 102 refers to the completion queue 1042 to check if an IO request (3) allocated to coroutine (3) exists.

Regardless of whether an IO request (3) exists in the completion queue 1042, the user space file system 102 completes polling of coroutine (3). In the example of FIG. 6, an IO request (3) exists in the completion queue 1042; thus, it is determined that IO request (3) has been completed. Then, the user space file system 102 deletes IO request (3) from the completion queue 1042.

When polling of coroutine (3) is completed, the user space file system 102 performs a context switch, and switches the execution right to coroutine (1) The user space file system 102 refers to the completion queue 1042 to check if an IO request (1) allocated to coroutine (1) exists.

Regardless of whether an IO request (1) exists in the completion queue 1042, the user space file system 102 completes polling of coroutine (1). In the example of FIG. 6, an IO request (1) exists in the completion queue 1042; thus, it is determined that IO request (1) has been completed. Then, the user space file system 102 deletes IO request (1) from the completion queue 1042.

<1-4> Advantages

According to the computer system 1 of the first embodiment described above, POSIX-compliant software is used to realize, in the user space, the user space file system 102, the user space thread 103, the user space queue 104, and the user space driver 105.

In the computer system 1 according to the first embodiment, multiple processes from the application are unified in a single instruction row, thereby suppressing the number of times of MMIO. This makes it possible to use POSIX-compliant applications without rewriting and to access the semiconductor storage device 3 without using the kernel space. Therefore, it is possible to suppress the performance deterioration caused by using the kernel space.

For example, while switching threads in the kernel space may require a time of a few μs, a context switch in the user space can be executed in the time of a few ns. According to the computer system 1 of the first embodiment, it is not necessary to switch threads in the kernel space. This allows for operation at a higher speed than the operation via the kernel space.

For polling, repeating polling for a certain coroutine is not efficient. For example, with reference to FIG. 7, a description will be given of a case where IO request (1) of coroutine (1) has not been completed while IO request (2) of coroutine (2) and IO request (3) of coroutine (3) have been completed. FIG. 7 illustrates an example of detection of IO request completion of a computer system 1 according to a comparative example.

Ina case illustrated in FIG. 7, if polling for coroutine (1) is repeated until IO request (1) for coroutine (1) is completed, even though the other IO requests have been completed, polling is performed in an inefficient manner. Immediate detection of IO request completion is essential to a low latency system. In addition, polling wastefully consumes the host CPU 20.

However, according to the computer system 1 of the first embodiment, polling is performed while appropriately switching coroutines using a context switch. This allows polling to be performed in an effective manner. Consequently, the operation of the computer system 1 can be performed at a high speed.

<2> Second Embodiment

Next, the second embodiment will be described. The second embodiment describes a case where a buffer cache 106 is prepared in the user space. Hereinafter, descriptions of portions similar to those of the first embodiment will be omitted.

Figure 8:
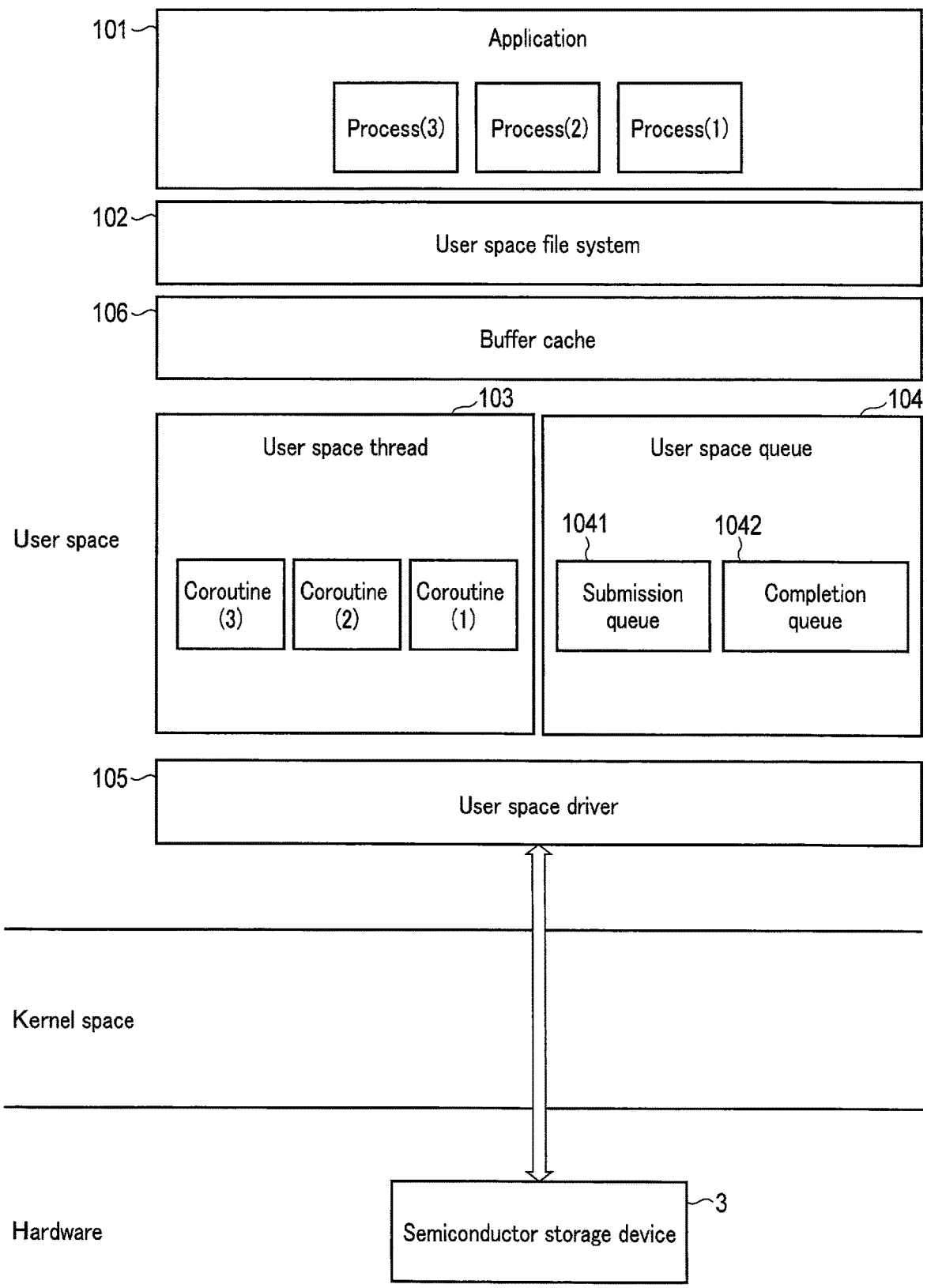
FIG. 8 illustrates a software configuration of a computer system according to a second embodiment.

With reference to FIG. 8, a software configuration of a computer system 1 according to the second embodiment will be described. FIG. 8 illustrates a software configuration of the computer system 1 according to the second embodiment.

As illustrated in FIG. 8, the buffer cache 106 is prepared in the user space.

The buffer cache 106 can increase the speed of the host 2 by caching various data items. Furthermore, the buffer cache 106 can increase the speed of the host 2 by, for example, buffering and delaying writing in the queue from the coroutine.

The buffer cache 106 is produced based on a cache algorithm such as Adaptive Replacement Cache [FAST'03], for example. By adopting the buffer cache 106, a long-term access tendency can be obtained.

Furthermore, by taking advantages of adopting coroutines, the buffer cache 106 can be produced in a lockless manner. The buffer cache 106 only requires that the data structure be consistent at the time of context switching. The buffer cache 106 makes an IO request at the end after changing a list, hash table, and the like. In this case, a context switch occurs in the IO request.

Furthermore, use of the buffer cache 106 enable to directly perform DMA in zero-copy.

Moreover, when the buffer cache 106 is used, the operation is performed in the same memory space; thus, the user space file system 102 can directly use the buffer of the application.

The computer system 1 according to the second embodiment described above adopts the buffer cache 106 in the user space, and this makes it possible to further increase the speed of the computer system 1.

<3> Third Embodiment

Next, the third embodiment will be described. The third embodiment describes a case where a kernel space queue and a kernel space driver are prepared in the kernel space. Descriptions of portions similar to those of the first embodiment will be omitted.

With reference to FIG. 9, a software configuration of a computer system 1 according to the third embodiment will be described. FIG. 9 illustrates a software configuration of the computer system 1 according to the third embodiment.

As illustrated in FIG. 9, a kernel space queue 201 and a kernel space driver 202 are prepared in the kernel space.

The kernel space queue 201 includes a submission queue 2011 and a completion queue 2012. The submission queue 2011 is a command queue having a specific slot size, and is used by the host 2 to issue an IO request executed by the controller 4 of the semiconductor storage device 3. The completion queue 2012 is a response queue having a specific slot size and is used to provide notification of a status regarding a completed IO request.

The kernel space driver 202 is a driver for connection to the semiconductor storage device 3. For example, if the semiconductor storage device 3 adopts NVMe, the kernel space driver 202 will be a driver adaptable to NVMe.

In the third embodiment, the host 2 and the semiconductor storage device 3 are connected not by the MMIO method.

In issuing the IO request, the user space file system 102 supplies the IO request allocated to the coroutine of the user space thread 103 to the kernel space queue 201 by a system call. In this manner, the kernel space driver 202 supplies the IO request written in the submission queue 2011 of the kernel space queue 201 to the semiconductor storage device 3.

Furthermore, upon receipt of the IO request completion notification from the semiconductor storage device 3, the kernel space driver 202 writes the same in the completion queue 2012 of the kernel space queue 201.

In the third embodiment, Libaio and liburing can be used.

The computer system 1 according to the third embodiment can produce the same advantages as those of the first embodiment.

<4> Others

Each of the above-described embodiments is applicable to databases, the cloud, and cloud and dispersion storage.

The various types of processing in the embodiment can be implemented by a computer program. Therefore, the processing may be executed through a computer-readable storage medium that stores the computer program by installing the computer program in a common computer.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A data processing device comprising:
    a user space including a user space thread including a plurality of coroutines; and
    a file system configured to:
       allocate a plurality of processes generated by an application to the plurality of coroutines;
       check the plurality of coroutines in order;
       when a first process included in the plurality of processes is allocated to a first coroutine included in the plurality of coroutines, write a first IO request based on the first process in a submission queue; and
       when the submission queue is filled, or when checking the plurality of coroutines is finished, transmit the first IO request written in the submission queue to a storage device.

2. The device according to claim 1, wherein the file system is capable of writing a plurality of IO requests including the first IO request in the submission queue.

3. The device according to claim 2, wherein the plurality of IO requests written in the submission queue are collectively transmitted to the storage device.

4. The device according to claim 1, wherein the user space is a memory area in which the application is developed and which is used by the application.

5. The device according to claim 1, wherein the storage device is a solid state device (SSD) including a NAND-type flash memory.

6. The device according to claim 1, wherein
in the user space, the file system is configured to:
determine whether the first IO request has been completed in the storage device; and
regardless of whether the first IO request has been completed, determine whether a second IO request for second coroutine included in the plurality of coroutines has been completed.

7. The device according to claim 6, wherein
the first IO request is written in a completion queue when the first IO request has been completed, and
in the user space, the file system is configured to:
determine whether the first IO request has been completed by checking the completion queue; and
when the first IO request has been completed, delete the first IO request from the completion queue.

8. The device according to claim 1, further comprising a first driver provided in the user space and configured to transmit the first IO first request written in the submission queue to the storage device.

9. The device according to claim 1, wherein when the plurality of coroutines are checked in order, a context switch is performed to switch coroutines to be checked.

10. The device according to claim 6, wherein when the plurality of coroutines are checked in order as to whether IO requests corresponding the plurality of coroutines have been completed, a context switch is performed to switch the plurality of coroutines to be checked.

11. The device according to claim 1, wherein in the user space, the file system is configured to write the first 10 request in the submission queue from the first coroutine via a buffer cache.

12. The device according to claim 1, wherein the submission queue is provided in a kernel space.

13. The device according to claim 12, wherein the file system is configured to supply the first IO request to the submission queue by a system call.

14. The device according to claim 12, further comprising a first driver provided in the kernel space and configured to transmit the first IO request written in the submission queue to the storage device.

15. The device according, to claim 7, wherein the completion queue is provided in a kernel space.

16. The device according to claim 12, wherein the kernel space is a memory area in which a kernel is developed and which is used by the kernel.

* * * * *